United States Patent [19]
Ustuner

[11] Patent Number: 5,919,138
[45] Date of Patent: Jul. 6, 1999

[54] ULTRASOUND IMAGING SYSTEM USER INTERFACE

[75] Inventor: Kutay F. Ustuner, Mountain View, Calif.

[73] Assignee: Acuson Corporation, Mountain View, Calif.

[21] Appl. No.: 08/916,684

[22] Filed: Aug. 22, 1997

[51] Int. Cl.$^6$ .................................................. A61B 8/00
[52] U.S. Cl. ........................................ 600/443; 600/437
[58] Field of Search .................................. 600/437, 440, 600/441, 443, 447, 455; 128/916

[56] References Cited

U.S. PATENT DOCUMENTS

| | | | |
|---|---|---|---|
| 5,161,535 | 11/1992 | Short et al. | 340/712 |
| 5,379,771 | 1/1995 | Kawasaki et al. | 600/455 X |
| 5,394,871 | 3/1995 | Sauer et al. | 600/437 X |
| 5,553,620 | 9/1996 | Snider et al. | 600/440 |
| 5,685,308 | 11/1997 | Wright et al. | 600/447 X |
| 5,722,412 | 3/1998 | Pflugrath et al. | 600/441 X |
| 5,873,829 | 2/1999 | Kamigama et al. | 600/443 |

*Primary Examiner*—Francis J. Jaworski
*Attorney, Agent, or Firm*—Brinks Hofer Gilson & Lione

[57] ABSTRACT

An ultrasound imaging system user interface is provided. The interface comprises an imaging-parameter-selection domain comprising a plurality of domain locations, each corresponding to a respective plurality of imaging parameter configurations that affect spatial resolution, temporal resolution, and sensitivity. The interface also comprises an input means for progressively selecting a domain location. The domain can be one-or two-dimensional. In a two-dimensional domain, the plurality of imaging parameter configurations can be at least partially a function of distances from a selected domain location to each corner of the domain. In one embodiment, the domain comprises three corners that correspond to parameters that will provide an image with the best spatial resolution, temporal resolution, and sensitivity, respectively. With the ultrasound imaging system user interface, a user can selectively apply a plurality of ultrasound imaging system parameters.

19 Claims, 2 Drawing Sheets

SELECT A DOMAIN LOCATION IN AN IMAGING-PARAMETER-SELECTION DOMAIN — 410

APPLY THE IMAGING PARAMETER CONFIGURATIONS CORRESPONDING TO THE SELECTED DOMAIN LOCATION — 420

ULTRASOUND IMAGING SYSTEM USER INTERFACE

BACKGROUND OF THE INVENTION

In adjusting imaging parameters of an ultrasound imaging system, a user often makes compromises among the inter-related image characteristics of spatial resolution, temporal resolution, and sensitivity. As is well known in the art, "spatial resolution" and "temporal resolution" respectively refer to the ability to detect or separate closely spaced objects in space and the ability to detect temporal variation. As is also well known in the art, "sensitivity" refers to the ability to perceive imaged structures associated with weak return echo amplitudes. For example, in a B-Mode image, spatial resolution is determined by many imaging parameters such as operating frequency, number of transmit foci, spatial filter, and temporal filter. Most of these imaging parameters also either directly or indirectly affect temporal resolution and sensitivity. Most users, however, do not understand the physics of ultrasound or signal processing enough to appreciate the various ways these imaging parameters interplay with each other and, as a result, do not optimally adjust the imaging parameters.

Application-specific system presets offer a typically unsatisfactory solution to system optimization. In many ultrasound imaging systems, a user can select an application-specific system preset corresponding to the part of the body he is imaging (e.g., abdomen, carotid, small parts). Application-specific system presets are typically designed conservatively to provide good image quality for a wide range of patient population and for most imaging situations. However, for a particular application, the specific imaging parameter configurations that will result in optimal spatial resolution, temporal resolution, and sensitivity can vary from study to study or from user to user. As a result, the user is again presented with the problem of adjusting individual parameters without understanding how the individual imaging-parameter controls work and the inter-relationships and compromises associated with each parameter. The problem is aggravated when several components, each with their own system-specific features, are used.

In addition to application-specific system presets, some ultrasound imaging systems offer limited control over the relative priority of imaging parameters that affect both spatial and temporal resolution but not sensitivity. Separate controls for imaging parameters that affect sensitivity are typically needed because of the complexity involved in coordinating the parameters that affect sensitivity with the parameters that affect spatial and temporal resolution. For example, the Space/Time control on the Sequoia™ imaging system by Acuson Corporation controls some beamformer parameters such as the transmit and receive aperture size, number of beams acquired in parallel, and line density. With other systems, a corresponding feature may only control line density. Because they do not affect sensitivity, these limited controls do not provide optimal performance.

There is, therefore, a need for an ultrasound imaging system user interface that will overcome the problems described above.

SUMMARY OF THE INVENTION

The present invention is directed to an ultrasound-imaging-system user interface that allows a user to easily control imaging parameters to optimize detail resolution, temporal resolution, and sensitivity without the knowledge of many of the system-specific features.

According to a first aspect of this invention, an ultrasound imaging system is provided for selecting a plurality of ultrasound imaging system parameters using a imaging-parameter user interface.

According to a second aspect of this invention, an imaging-parameter user interface comprises an imaging-parameter-selection domain comprising a plurality of domain locations, each of said plurality of domain locations corresponding to a respective plurality of imaging parameter configurations that affects spatial resolution, temporal resolution, and sensitivity. The domain can be two dimensional or a one-dimensional vectorized form of a two-dimensional domain. The user interface also comprises an input means for progressively selecting a domain location.

The imaging-parameter-selection domain can comprise a plurality of corners, wherein each of said plurality of domain locations is characterized by a respective distance from each of said corners, and wherein each of said plurality of imaging parameter configurations is at least partially a function of the respective distances. The plurality of corners can comprise a first, second, and third corner. The first corner comprises a first domain location corresponding to a first plurality of imaging parameters configured to provide improved spatial resolution. The second corner comprises a second domain location corresponding to a second plurality of imaging parameters configured to provide improved temporal resolution, and the third corner comprises a third domain location corresponding to a third plurality of imaging parameters configured to provide improved sensitivity (e.g., more penetration).

According to a third aspect of this invention, a method for selectively applying a plurality of ultrasound imaging system parameters is provided. This method comprises the steps of selecting a domain location in an imaging-parameter-selection domain, said domain location corresponding to a respective plurality of imaging parameter configurations that affect spatial resolution, temporal resolution, and sensitivity, and applying the imaging parameter configurations corresponding to the selected domain location.

The imaging-parameter user interface of the above aspects is designed so that it configures all or a subset of at least two of the following imaging parameters: operating frequency, operating bandwidth, transmit aperture size, receive aperture size, spatial filters, temporal filters, number of beams acquired in parallel, flow sample count, pulse repetition frequency, velocity scale, dynamic range, post-processing maps, ultrasound line density, number of transmit foci, and transmit focus depth.

The preferred embodiments of the invention will now be described with reference to the attached drawings.

DETAILED DESCRIPTION OF THE PRESENTLY PREFERRED EMBODIMENTS

Figure 1:
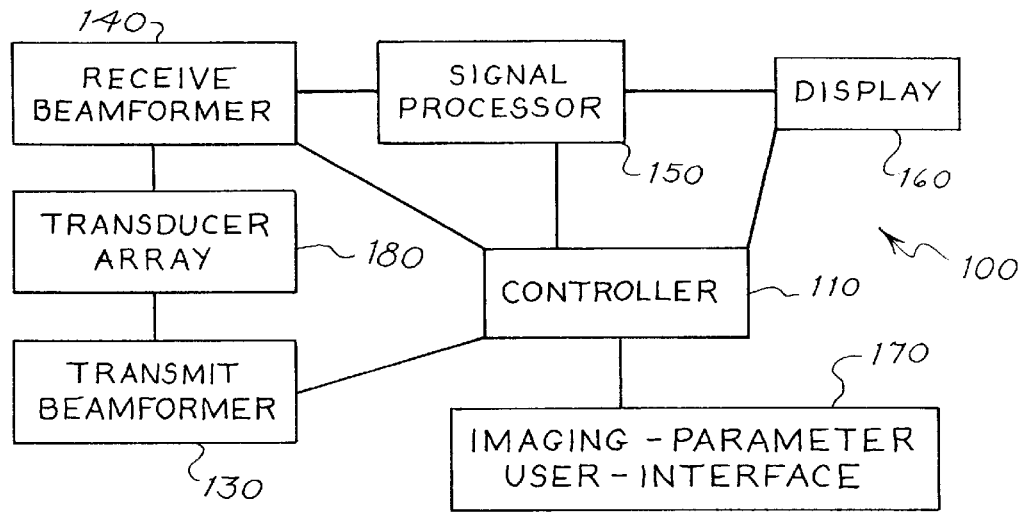
FIG. 1 is an illustration of a block diagram of an ultrasound imaging system of a preferred embodiment.

Turning now to the drawings, FIG. 1 shows a block diagram of an ultrasound imaging system 100 of a first preferred embodiment. As shown in this figure, a controller 110 is coupled to a transmit beamformer 130, a receive beamformer 140, a signal processor 150, and a display 160 and is responsive to an imaging-parameter user interface 170. A transducer array 180 is responsive to the transmit beamformer 130 and coupled to the receive beamformer 140. As used herein, "coupled to" means directly coupled to or indirectly coupled through one or more components, and "responsive to" means directly responsive to or indirectly responsive through one or more components. The components of this system 100 will be described in more detail below.

The controller 110 coordinates the components of this system 100 to perform ultrasonic visualization—the well-known interrogating-and-imaging process which includes ultrasound generation, ultrasound detection, image reconstruction, and image presentation phases. During the ultrasound generation phase, the transmit beamformer 130 applies multiple signals to elements of the transducer array 180 to cause it to vibrate and emit ultrasonic energy to a tissue. Next, in the ultrasound detection phase, the receive beamformer 140 measures the signals created by the transducer array 180 when ultrasonic energy reflected by the structures in the tissue impinge on the transducer array 180. The signals generated by the receive beamformer 140 are channeled to the signal processor 150 for image reconstruction. During this phase, the signal processor 150 processes the detected signals to create an image, which is presented on the display 160 during the image presentation phase.

Generally, the imaging-parameter user interface 170 comprises an imaging-parameter-selection domain and an input means for progressively selecting a location in the domain. Each location in the domain corresponds to a plurality of imaging parameter configurations that are application-independent. By using the input means (which can be, for example, a joystick, a touch pad, a graphical user interface, or any other suitable selection device), the user selects one location in the domain. The plurality of imaging parameter configurations associated with that location is then applied to the ultrasound image.

Figure 2:
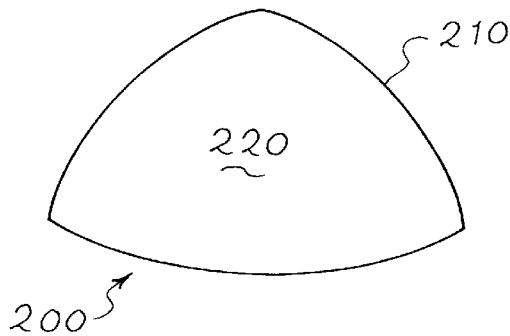
FIG. 2 is an illustration of an imaging-parameter user interface of a preferred embodiment having a two-dimensional domain.
Figure 3:
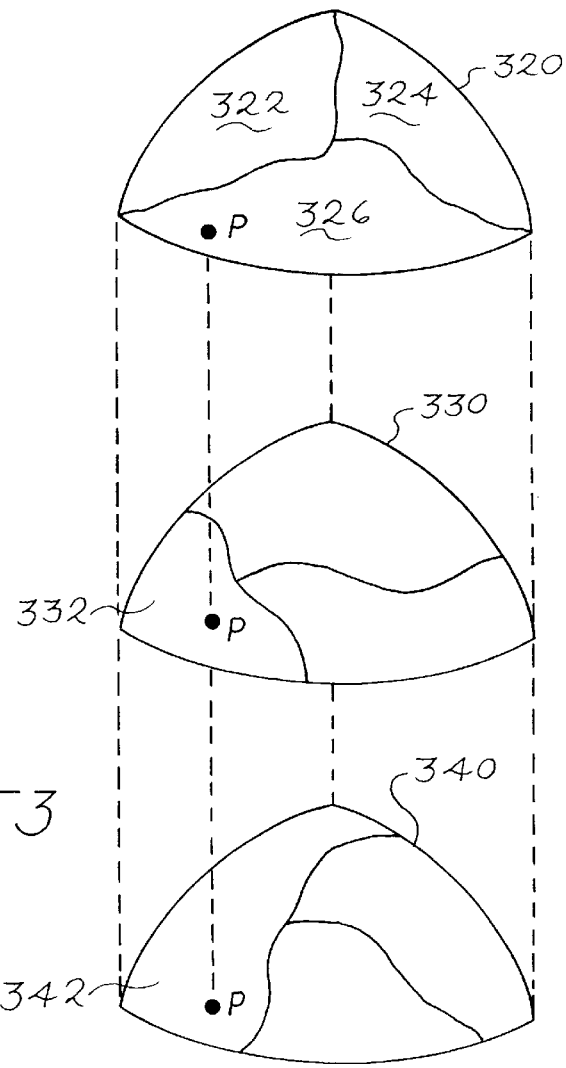
FIG. 3 is an illustration showing a stack of imaging-parameter-selection sub-domains that forms an imaging-parameter-selection domain.

In one preferred embodiment, the domain is two-dimensional. This is illustrated in FIG. 2. As shown in this figure, the imaging-parameter user interface 200 comprises an imaging-parameter-selection domain 210 and an input means 220 (here, a touch pad that overlies the imaging-parameter-selection domain 210). As shown in FIG. 3, the imaging-parameter-selection domain 210 can be conceptualized as representing a stack of imaging-parameter-selection sub-domains 320, 330, 340. Each sub-domain corresponds to one imaging parameter. For example, the first sub-domain 320 can represent line spacing, the second sub-domain 330 can represent transmit frequency, and the third sub-domain 340 can represent transmit aperture size.

Locations within each sub-domain correspond to a certain configuration of the parameter associated with that sub-domain. For example, locations in a first region 322 of the first sub-domain 320 correspond to a first line spacing configuration, locations in a second region 324 correspond to a second line spacing configuration, and locations in a third region 326 correspond to a third line spacing configuration. The boundaries of the locations within each sub-domain can be designed to coordinate the imaging parameter configurations. For example, the boundaries of the locations in the sub-domains 320, 330, 340 of FIG. 3 are designed so that point P lies in the third location 326 in the first sub-domain 320, a first location 332 in the second sub-domain 330, and a first location 342 in the third sub-domain 340. By designing sub-domains with different boundary locations, some imaging) parameter configurations remain the same while others change as a user progressively chooses different locations in the domain.

Figures 4, 5, 6:
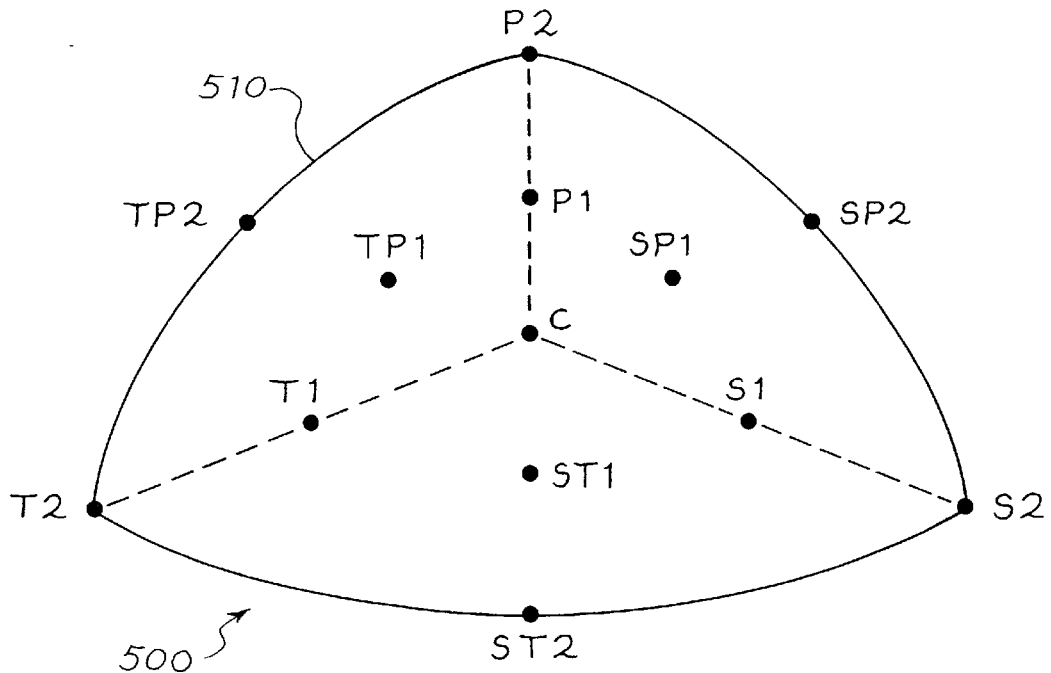
FIG. 4 is a flow chart of a method for selectively applying a plurality of ultrasound-imaging-system parameters.
FIG. 5 is an illustration of an imaging-parameter-selection domain comprising a first, second, and third corner configured to provide the best spatial resolution, temporal resolution, and sensitivity, respectively.
FIG. 6 is an illustration of an alternative imaging-parameter user interface having a one-dimensional domain.

As FIG. 4 illustrates, the imaging-parameter user interface 170 can be used in a method for selectively applying a plurality of ultrasound-imaging-system parameters.

As shown in FIG. 4, this method comprises the steps of selecting a domain location in an imaging-parameter-selection domain (step 410) and applying the imaging parameter configurations corresponding to the selected domain location (step 420). The steps of this method will be described in more detail below.

The first step in the method is to select a domain location in an imaging-parameter-selection domain (step 410). Using the input means 220, a user selects a location in the domain, thereby communicating his request to the ultrasound system 100. Next, the imaging parameter configurations corresponding to the selected domain location are applied (step 420). The imaging parameters can be applied throughout an entire ultrasound image or a selected portion thereof. For example, in F-Mode, a region can be selected by selecting a color-pan-box position and size. In B-mode, a region can be selected by using a display depth control. A user can also use the Regional Expansion® ("RES") or zoom feature found in commercial imaging systems to select a RES or zoom box position and size. In operation, the controller 110, which controls the operation of the components of the system 100, configures the components of the system 100 according to the user's request communicated via the imaging-parameter user interface 170.

As an example of this method, consider an imaging-parameter user interface 500 shown in FIG. 5. The domain 510 of this interface 500 comprises a first (S2), second (T2), and third (P2) corner. Imaging parameters of each sub-domain are configured so that the corners (S2), (T2), (P2) represent locations in the domain 510 that will provide the ultrasound image with the best spatial resolution, temporal resolution, and sensitivity (e.g., penetration), respectively. The center (C) of the domain 510 is where the relative priorities of spatial resolution, temporal resolution, and sensitivity are equal. The center (C) can also be the location that corresponds to a default configuration. The relative priorities at other locations in the domain 510 are determined by the relative distances from the three corners (S2), (T2), (P2) and the center (C).

If the user desires an image with maximum spatial resolution, he can choose the corner (S2), which corresponds to imaging parameter configurations that will result in the best spatial resolution. If after viewing the image, the user desires to improve temporal resolution while still maintaining better spatial resolution than sensitivity, he can progressively chose locations, such as (ST2), in the domain 510 that are closer to the temporal resolution corner (T2) and are closer to the spatial resolution corner (S2) than the sensitivity corner (P2). As the user is articulating the input means 220 to select the locations, some imaging parameter configurations can change to provide better temporal resolution at the cost of reduced spatial resolution while other imaging parameter configurations can remain constant to continue good spatial resolution.

The user continues to articulate the input means until he is satisfied with the resulting image. If, for example, location (ST2) results in an image with unacceptable spatial resolution, the user can select a location closer to the spatial resolution corner (S2). In this way, the user can easily vary the configuration of many imaging parameters to optimize the performance of the imaging system merely based on the relative priorities of spatial resolution, temporal resolution, and sensitivity. That is, with the interface of these preferred embodiments, the user does not need to understand the physics of ultrasound, signal processing, or the many specific features of the imaging system. The imaging parameters controlled by the interface include parameters that affect sensitivity and are application-independent. Thus, the imaging parameter user interface increases user efficiency and diagnostic confidence by providing easy and fast access to the best operating combinations.

Imaging Parameters

As mentioned above, the domain can be conceptually thought of as a stack of a plurality of sub-domains, where each sub-domain corresponds to an ultrasound imaging parameter. Any imaging parameter can be represented by a sub-domain. For example, imaging parameters can include operating frequency, operating bandwidth, transmit aperture size, receive aperture size, spatial filters, temporal filters, number of beams acquired in parallel, flow sample count, pulse repetition frequency, dynamic range, post-processing maps, ultrasound line density, number of transmit foci, transmit focus depth, and any combination thereof. It is important to note that other parameters can also be used.

Operating frequency is the center frequency of a received ultrasound signal. For a fixed aperture size, lateral resolution increases with increased frequency, and sensitivity (at deep depth) increases with decreased frequency. Bandwidth of the displayed signal determines axial resolution and sensitivity. Transmit and receive aperture sizes are varied as a function of range and determine lateral resolution. Spatial filters determine the amount of spatial edge enhancement or smoothing, which increases sensitivity by reducing spatial noise. Temporal filters, typically low-pass filters, determine the amount of temporal smoothing, which increases sensitivity by reducing spatial noise. If the object is in motion, temporal filtering also introduces spatial smoothing.

Number of beams acquired in parallel refers to simultaneously acquired independent receive beams. Simultaneous acquisition of multiple beams improves temporal resolution and/or spatial resolution. Flow sample count is the total number of firings along each F-Mode line to form a frame of an F-Mode image. Signal-to-noise ratio increases with increasing flow sample count. Pulse repetition frequency is the repetition frequency of the pulses fired along the same F-Mode line. Pulse repetition frequency determines the maximum velocity that can be detected without aliasing. Low pulse repetition frequency provides higher sensitivity to low velocity flow but also increases sensitivity to motion artifact due to hand or tissue motion and aliases high velocity flow. Dynamic range allows a user to control the display dynamic range. Post-processing maps change the gray-level mapping to provide a smooth or contrasty image.

The imaging parameter configurations determined by the selection of a domain location can be used, along with the axial extent of a selected region (i.e., depth range of interest or DROI), to automatically calculate additional imaging parameters. For example, ultrasound line spacing equals the Nyquist line spacing. The Nyquist line spacing is one over the Nyquist sampling rate in azimuth, which is a function of the operating frequency and transmit and receive aperture sizes.

Foci positions and the number of foci can be determined by first placing a focus at the center of the DROI and then continuously placing other foci at a depth of field apart until all points in the DROI (or some central portion of it) are within the depth of field of one of the transmit foci. The depth of field is a measure of how good the focusing is away from the transmit focus. For a particular transmit focus depth, depth of field is defined by the range over which the round-trip beamwidth is typically less than 120% of the minimum beamwidth. The minimum beamwidth at any particular depth is the best round-trip beamwidth achievable at the depth. The minimum beamwidth can be a strong function of depth for the curved arrays and the steered scanning formats (e.g., sector, Vector™). Note that since depth of field is, in general, a function of the focus depth, the transmit foci may not be distributed uniformly over the DROI.

In one of the embodiments described above, three corners of the imaging-parameter-selection domain correspond to locations in the domain that will provide the ultrasound image with the best spatial resolution, temporal resolution, and sensitivity, respectively. The corner (S2) corresponding to the best spatial resolution would have, for example, the following imaging parameter configurations: highest operating frequency, maximum bandwidth, maximum transmit and receive aperture growth rate, maximum edge enhancement, and minimum persistence. Given the above selection, dynamic range and post-processing maps for this corner are then chosen as appropriate for the easy-to-image body type. Other parameters that do not affect spatial resolution, such as flow sample count and pulse repetition frequency, are assigned a default value.

The corner (T2) corresponding to the best temporal resolution would have, for example, the following imaging, parameter configurations: lowest operating frequency, minimum transmit and receive aperture growth rate, minimum persistence, and minimum flow sample count. Given the above selections, dynamic range and post-processing maps for this corner are then chosen as appropriate for the average-body type. Since temporal resolution is not dependent on bandwidth, edge enhancement, or spatial smoothing, a default value is selected for these parameters.

The corner (P2) corresponding to the best sensitivity would have, for example, the following imaging parameter configurations: lowest operating frequency, narrow bandwidth, maximum transmit and receive aperture growth rate, very high spatial smoothing, very high persistence, maximum flow sample count, very low pulse repetition frequency (low velocity scale), and low dynamic range (both for B-Mode and Color Doppler Energy Mode). Given the above selections, post-processing maps for the best sensitivity corner are then chosen as appropriate for the difficult-to-image body type.

At the center of the domain, the imaging parameters are configured such that the relative priorities of spatial resolution, temporal resolution, and sensitivity are equal. For B-Mode images, it is preferred that the domain locations at and around the center of the domain be set to the second harmonic operating frequency, if available. The configuration of the imaging parameters at other locations in the domain 510 are determined according to the relative distances from the three corners (S2), (T2), (P2).

Implementation

The imaging-parameter user interface described above can be implemented in an ultrasound imaging system in several ways. The imaging-parameter user interface can be the only user interface of the imaging system that controls imaging parameters. Alternatively, the imaging-parameter user interface can operate along with imaging parameter controls found in conventional ultrasound imaging systems. If the imaging parameters controlled by the imaging-parameter user interface are different than the ones controlled by the conventional parameter controls, the two interfaces can operate without conflict. If, however, at least one imaging parameter can be controlled by either the imaging-parameter user interface or the conventional parameter controls, one interface will be given priority over the other with respect to that parameter. When multiple parameters can be controlled by either of the two interfaces, one interface can be given priority over some of the shared parameters but not others. In this way, a user can select a location in the imaging-parameter domain and then adjust various parameters to provide, for example, frequency, velocity scale, etc.

FIG. 6 shows an alternative to the two-dimensional domain shown in FIG. 5. In this alternative, the domain 610 is one dimensional, and the input means can be a button or a graphical user interface, such as a scrolling selection bar on a pull-down menu. As shown in this figure, a one-dimensional domain can be created by vectorizing the domain locations of a two-dimensional domain. FIG. 6 shows the translation from the two dimensional domain 510 of FIG. 5 to a one dimensional domain 610.

This one-dimensional domain 610 can be presented to the user as a set of application-independent presets which can be presented along with conventional application-dependent presets. Alternatively, a user can turn on one of the sets or presets as a part of the exam initialization process.

It is intended that the foregoing detailed description be understood as an illustration of selected forms that the invention can take and not as a definition of the invention. It Is only the following claims including all equivalents, that are intended to define the scope of this invention.

What is claimed is:

1. In an ultrasound imaging system comprising a transducer, a transmit beamformer coupled to the transducer, a receive beamformer responsive to the transducer, and a controller coupled to the transmit and receive beamformers, the improvement comprising:

an imaging-parameter user interface, coupled with the controller, comprising input means operative to progressively select one of a plurality of locations, each of said plurality of locations corresponding to a respective plurality of application independent imaging parameter configurations that affect spatial resolution, temporal resolution, and sensitivity, wherein the controller is operative to apply said plurality of imaging parameter configurations corresponding to said one of said plurality of locations selected by the input means.

2. The invention of claim 1, wherein the input means is operative to progressively select, in two dimensions, one of a plurality of locations.

3. The invention of claim 1, wherein the input means is progressively select in one dimension one of a plurality of locations.

4. The invention of claim 1, wherein the input means is operative to progressively select one of a plurality of locations positioned within a first, second, and third corner, wherein the first corner corresponds to a first plurality of imaging parameters configured to provide improved spatial resolution; wherein the second corner corresponds to a second plurality of imaging parameters configured to provide improved temporal resolution; and wherein the third corner corresponds to a third plurality of imaging parameters configured to provide improved sensitivity.

5. The invention of claim 1, wherein the input means comprises a joystick.

6. The invention of claim 1, wherein the input means comprises a touch pad.

7. The invention of claim 1, wherein the input means comprises a graphical user interface.

8. An ultrasound imaging system user interface for configuring a plurality of imaging parameters comprising:

input means operative to proressively select one of a plurality of locations, each of said plurality of locations corresponding to a respective plurality of application independent imaging parameter configurations that affect spatial resolution temporal resolution, and sensitivity; and means for applying said plurality of imaging parameter configurations corresponding to said one of said plurality of locations selected by the input means.

9. The invention of claim 8, wherein the input means is operative to progressively select, in two dimensions, one of a plurality of locations.

10. The invention of claim 8, wherein the input means is operative to progressively select, in one dimension, one of a plurality of locations.

11. The invention of claim 8, wherein the input means is operative to progressively select one of a plurality of locations positioned within a first, second, and third corner, wherein the first corner corresponds to a first plurality of imaging parameters configured to provide improved spatial resolution; wherein the second corner corresponds to a second plurality of imaging parameters configured to provide improved temporal resolution; and wherein the third corner corresponds to a third plurality of imaging parameters configured to provide improved sensitivity.

12. The invention of claim 8, wherein the input means comprises a joystick.

13. The invention of claim 8, wherein the input means comprises a touch pad.

14. The invention of claim 8, wherein the input means comprises a graphical user interface.

15. The invention of claim 8, wherein said plurality of imaging parameter configurations comprises at least two imaging parameters selected from the group consisting of operating frequency, operating bandwidth, transmit aperture size, receive aperture size, spatial filters, temporal filter, number of beams acquired in parallel, flow sample count, pulse repetition frequency, dynamic range, post-processing maps, ultrasound line density, number of transmit foci, transmit focus depth, and any combination thereof.

16. A method for selectively applying a plurality of ultrasound imaging system parameters comprising the steps of:

(a) progressively selecting one of a plurality of locations with an input means, each of said plurality of locations corresponding to a respective plurality of application independent imaging parameter configurations that affect spatial resolution, temporal resolution, and sensitivity; and (b) applying said plurality of imaging parameter figurations corresponding to said one of said plurality of locations selected in (a).

17. The method of claim 16, wherein the input means is operative to progressively select one of a plurality of locations positioned within a first, second, and third corner, wherein the first corner corresponds to a first plurality of imaging parameters configured to provide improved spatial resolution; wherein the second corner corresponds to a second plurality of imaging parameters configured to provide improved temporal resolution; and wherein the third corner corresponds to a third plurality of imaging parameters configured to provide improved sensitivity.

18. The invention of claim 16, wherein said plurality of imaging parameter configurations comprises at least two imaging parameters selected from the group consisting of operating frequency, operating bandwidth, transmit aperture size, receive aperture size, spatial filters, temporal filter, number of beams acquired in parallel, flow sample count, pulse repetition frequency, dynamic range, post-processing maps, ultrasound line density, number of transmit foci, transmit focus depth, and any combination thereof.

19. The invention of claim 1, wherein said plurality of imaging parameter configurations comprises at least two imaging parameters selected from the group consisting of operating frequency, operating bandwidth, transmit aperture size, receive aperture size, spatial filters, temporal filter, number of beams acquired in parallel, flow sample count, pulse repetition frequency, dynamic range, post-processing maps, ultrasound line density, number of transmit foci, transmit focus depth, and any combination thereof.

* * * * *

UNITED STATES PATENT AND TRADEMARK OFFICE
CERTIFICATE OF CORRECTION

PATENT NO. : 5,919,138     Page 1 of 2
DATED : July 6, 1999
INVENTOR(S) : Kutay F. Ustuner It is certified that error appears in the above-indentified patent and that said Letters Patent is hereby corrected as shown below:

Column 1, line 35, change "use" to --user--.

Column 4, line 10, delete the parenthesis ")".

Column 4, line 62, change "chose" to --choose--.

Column 5, line 3, before "good" insert --to provide the image with--.

Column 6, line 39, delete "," (comma) after "imaging".

Column 7, line 40, change "Is" to --is--; and after "claims" insert --,-- (comma).

<u>In the Claims</u>

Claim 8, line 3, change "proressively" to --progressively--.

UNITED STATES PATENT AND TRADEMARK OFFICE
CERTIFICATE OF CORRECTION

PATENT NO. : 5,919,138
DATED : July 6, 1999
INVENTOR(S) : Kutay F. Ustuner

It is certified that error appears in the above-indentified patent and that said Letters Patent is hereby corrected as shown below:

<u>In the Claims</u>

Claim 8, line 7, after "resolution" insert --,-- (comma).

Claim 16, line 10-11, change "figurations" to --configurations--.

Signed and Sealed this

Eighteenth Day of April, 2000

Attest:

Q. TODD DICKINSON

*Attesting Officer*  *Director of Patents and Trademarks*